United States Patent [19]
Dudley

[11] 3,798,726
[45] Mar. 26, 1974

[54] METERED COOLANT VALVE

[76] Inventor: George M. Dudley, 69-N. Boxwood St., Hampton, Va. 23369

[22] Filed: Jan. 27, 1972

[21] Appl. No.: 221,321

[52] U.S. Cl. ................................................ 29/106
[51] Int. Cl. ............................................. B26d 1/00
[58] Field of Search ...................................... 29/106

[56] References Cited
UNITED STATES PATENTS

| 2,060,358 | 11/1936 | Wood | 29/106 R |
| 2,080,401 | 5/1937 | Heard | 29/106 R |
| 3,561,299 | 2/1971 | Brisk et al. | 29/106 R |

FOREIGN PATENTS OR APPLICATIONS

| 820,308 | 9/1959 | Great Britain | 29/106 R |

*Primary Examiner*—Harrison L. Hinson
*Attorney, Agent, or Firm*—Howard J. Osborn; John R. Manning

[57] ABSTRACT

A metering coolant valve is disclosed for directing fluid coolant onto each of a plurality of bits or tools mounted on a rotatable assembly. The plurality of tools are mounted upon a rotatable shaft for successively bringing each bit into contact with the work product to be machined. The fluid coolant is directed from a suitable supply to a distribution assembly fixedly disposed for rotative movement with the shaft. The fluid coolant is selectively distributed to each of the tools by a distribution assembly including a conduit or tube associated with each of the bits and having a first end disposed to direct the coolant onto the bit when it is in operative relationship with the work product and a second end selectively mounted upon the periphery of the shaft. As the shaft rotates with the distribution assembly, each conduit is brought into fluid-exchange relationship with a metering assembly to thereby direct the coolant fluid through the corresponding conduit and onto that bit in operative relationship with the work product. The metering assembly includes a valve opening disposed adjacent the periphery of the shaft and disposable in alignment with one of the conduits as the second end of the conduit is rotated thereby. The valve opening is so dimensioned that the conduits are rotated into a fluid exchange relationship with the conduit opening for a predetermined angle of rotation to thereby control the amount of fluid coolant directed onto each of the bits and also the duration of time that the fluid is directed thereto. Further, a handle is fixedly attached to the metering assembly to ensure that the metering assembly does not rotate with the shaft when in operation and also to adjust selectively the position of the conduits with respect to the valve opening of the metering assembly to prevent further fluid coolant flow when the machine has ceased operation.

8 Claims, 4 Drawing Figures

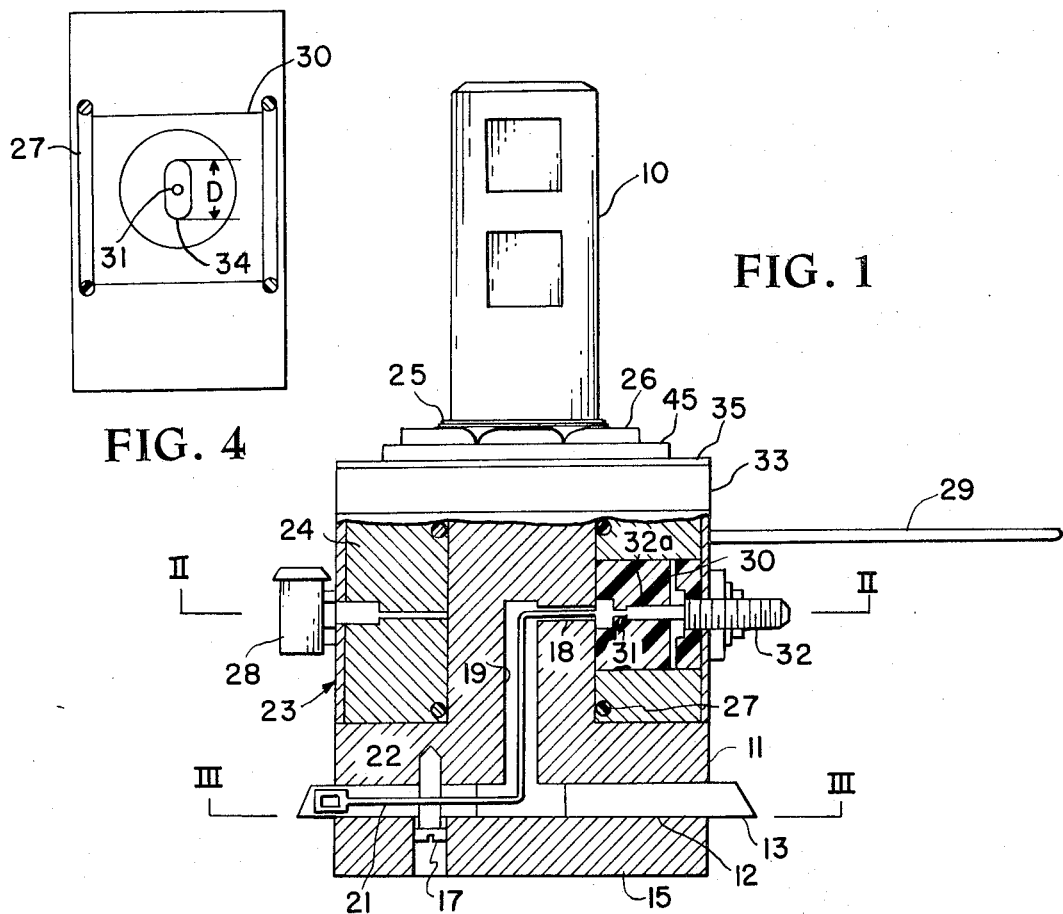
FIG. 4
FIG. 1
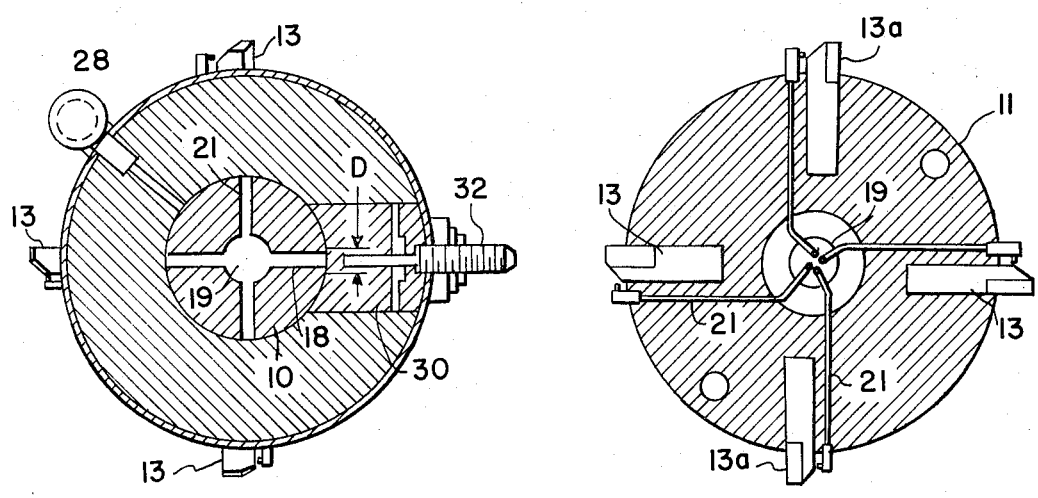
FIG. 2
FIG. 3

3,798,726

METERED COOLANT VALVE

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. FIELD OF THE INVENTION

This invention relates to coolant valves and in particular, to coolant valves for directing a fluid coolant onto a machine assembly including a plurality of tool elements or bits.

2. DESCRIPTION OF THE PRIOR ART

In the prior art, there has existed the problem of finding an efficient, inexpensive method of turning or milling super-alloys such as a high temperature, precipitated hardened alloy of nickel. The machine ability of this alloy is rated as 6 on a scale where that of AISI B1112 steel is rated as 100. It may be understood that the speed of machining or turning is dependent upon the efficiency of heat removal from the tool. In the prior art, a continuous stream of fluid coolant such as freon has been directed onto a cutting apparatus including a plurality of bits or tool elements which are rotated to machine the work product such as the alloy mentioned above. The use of a continuous flow of fluid coolant onto such cutting apparatus has restricted typically the maximum cutting rates of the alloy to approximately 28 fpm. Even at this slow rate, efficient heat dissipation has not been achieved with the result that the tool elements dull quickly thus requiring much time to sharpen and reset the tools. In addition, the continuous flow of fluid coolant leaves deposits on the tool and on the work which must be subsequently removed. As a result, the time and therefore the expense of machining super-alloys becomes prohibitive and this technique has not been used in many applications for which it would otherwise be considered. Further, the use of a continuous flow of fluid coolant is not only expensive because of the time consumed, but also because of the quantity of fluid coolant required.

SUMMARY OF THE INVENTION

It is therefore an object of this invention to provide a new and improved apparatus and method for machining hard-to-machine metals, such as super-alloys.

It is a further object of this invention to provide a new and improved apparatus and method for directing a coolant onto the tool bits of a machining apparatus to achieve more efficient cooling and particle removal.

It is a still further object of this invention to provide a new and improved method and apparatus for cooling the tool elements of a machining apparatus whereby the quantity of required coolant is reduced.

These and other objects are achieved in accordance with the teachings of this invention by providing a rotating assembly for receiving a plurality of tool bits or elements and a distribution assembly for directing a coolant fluid onto that bit or element that is in operative machining relationship with the work product. In particular, the distribution assembly includes a plurality of conduits disposed for rotation with the rotating assembly having a first end for directing the fluid onto the tool bit and a second end disposed on the periphery of the rotating assembly. Further, a metering assembly is disposed about the periphery of said rotating assembly and includes a tubular member for receiving the fluid coolant, which tubular member has a valve opening disposed in fluid exchanging relationship with the second openings of the conduits. Thus, as the rotating assembly is rotated to machine the work product, successive increments of the fluid coolant are directed through the conduits and onto that tooling bit in operative machining relationship with the work product.

In one aspect of this invention, the size of the opening is selected to determine the duration in which the fluid coolant is directed onto each tool element and therefore the amount of fluid coolant directed thereon, according to that angle of rotation in which the second opening of the one conduit is in fluid transfer relationship with the valve opening.

In a further aspect of this invention, a handle is associated with the metering assembly for disposing fixedly the metering assembly with respect to the rotating assembly during a machining operation, and also for rotating the metering assembly from a fluid exchange relationship between the valve opening and one of the conduits associated with a bit element to thereby terminate the flow of fluid coolant when the machining operation is terminated.

BRIEF DESCRIPTION OF THE DRAWINGS

These and other objects and advantages of the present invention will become more apparent by referring to the following detailed description and accompanying drawings, in which:

FIG. 1 is a partially sectioned view of the coolant valve in accordance with the teachings of this invention;

FIG. 2 is a sectioned view of the coolant valve taken along lines II—II of FIG. 1;

FIG. 3 is a sectioned view of the coolant valve of FIG. 1 taken along the line III—III of FIG. 1; and FIG. 4 is a sectioned view of the metering assembly incorporated into the coolant valve as shown in FIG. 1.

DETAILED DESCRIPTION OF THE PREFERRED EMBODIMENT

With reference to the drawings and in particular to FIG. 1, there is shown a coolant valve in accordance with the teachings of this invention, comprising a rotatable shaft 10 which is connected to a suitable drive means such as a milling machine or other powered machinery (not shown) for rotating the shaft 10. The rotatable shaft 10 is integrally connected to an enlarged end portion forming a rotatable tool mounting assembly 11. As more clearly indicated in FIG. 3, the tool mounting assembly 11 includes a plurality of slots 12 disposed at equal angles (e.g., 90°) about the asembly 11 for each receiving a tool element or bit 13. The tool elements 13 are securely held within the slots 12 by a clamping cap or plate 15 secured to the assembly 11 by a plurality of screws 17. The tool elements 13 each include a tungsten carbide insert or similar element, having a cutting edge 13a for machining the work product as the shaft 10 and therefore the mounting assembly 11 are rotated.

In accordance with the teachings of this invention, there is included a metering assembly 23 which may be disposed fixedly about the shaft 10 to selectively direct fluids onto each of the tool elements 13 as it comes into an operative or machining relationship with the work product. More specifically, the metering assembly 23 includes an annular collar 24 disposed about the shaft 10 for securely mounting thereon a coolant fitting 32, through which there is received from a reservoir (not shown) a suitable fluid coolant. As will be explained later, the fluid coolant is directed through the fitting 32 and tubular member 33 associated therewith. The annular collar 24 includes an opening for receiving a block 30 made of a suitable material such as neoprene. The block 30 includes a passage 31 for directing the fluid coolant from the tubular member 30 into a slot or valve opening 34 (FIG. 4).

The shaft 10 has an elongated opening 19 formed along the axis thereof for receiving a plurality of tubes or conduits 21 each associated with one of the tool elements 13. With reference to FIG. 3, each of the conduits 21 extends radially within a slot 22 from the opening 19 to the periphery of the mounting assembly 11, so that a first opening of the conduit 21 is disposed to direct coolant onto a portion of the tool element 13 to the rear of the cutting edge 13a. In an illustrative embodiment of this invention, the conduits 21 may be terminated in a suitable valves (or nozzles) for directing jets of the fluid coolant onto the tool elements 13. As more clearly indicated in FIG. 2, the conduits 21 extend through the elongated opening 19 and are bent at approximately 90° angles therewith to extend radially within corresponding slots 18. The other or second opening of the conduits 21 is disposed upon the periphery of the shaft 10 so that as the shaft is rotated, the second openings of the conduits 21 successively are aligned with the valve opening 34.

The annular collar 24 includes a pair of slots disposed upon the inner periphery thereof for each receiving an O-ring 27 for providing an effective seal to prevent escape of oil used for lubricating shaft 10 supplied by oiler cup 28 to be explained subsequently. The annular collar 24 is retained upon the shaft by an annular retaining member 33 disposed about the shaft 10 and held thereon by a locknut 26 secured upon a threaded portion 25 of the shaft 10. As indicated in FIG. 1, a bearing plate 45 and a lockwasher 35 are disposed between the locknut 26 and the retaining member 33. Further, a handle 29 is fixedly disposed to the metering assembly 24 to permit the metering assembly 24 to be held stationary as the shaft 10 rotates.

As shown in FIG. 1, an oiler cup 28 is provided to direct lubricant to the peripheral surface of the shaft 10, to relieve the sliding friction between the annular collar 24 and the shaft 10.

In operation, a suitable fluid coolant is directed from the reservoir to the coolant fitting 32. When a rotative drive is applied to shaft 10, the tool mounting assembly 11 is correspondingly rotated to successively bring the elements 13 into machining relationship with the work product. With regard to FIG. 2, each of the plurality of conduits 21 is successively rotated past the valve opening 34 to bring that conduit into a fluid exchange relationship for a period of time (or arc) dependent upon the dimension D of the valve opening 34. As a single conduit 21 is aligned with the opening 34, the fluid coolant is directed through the fitting 32, the tubular member 30, and passage 32 and into one of the conduits 21. Under suitable pressure, the fluid coolant passes through the conduit 21 to be discharged by the valve onto the tool element 13. In a particular embodiment of this invention, the valve forms a spray of the liquid coolant which is directed onto the cutting edge 13a under the nose radius thereof. Application at this point avoids interference by any chip of the work material being removed. The orifice of the valve is disposed a distance away from the tool element 13 so that the fluid coolant, which in one illustrative embodiment of this invention, may be a freon solvent of the fluorocarbon family, may be evaporated at the point of contact with the tooling element 13. Significantly, the fluid coolant is directed toward the immediate vacinity of the cutting edge; chips leaving the work product on one side of the cutting edge 13a would otherwise prevent the fluid coolant from reaching the cutting edge 13a if applied at that point. In turn, as the shaft 10 rotates, successive ones of the plurality of conduits 21 will be aligned with the valve opening 34, and the fluid coolant will be directed through that conduit onto that tool element 13 which is in machining relationship with the work product to be cooled. A significant aspect of this invention is the appropriate dimensioning of the valve opening 34. With regard to FIGS. 2 and 4, the dimension D determines that arc along the inter-periphery of the block 30 which in turn determines the length of time that one of the conduits 21 will be in a fluid exchange relationship with the valve opening 34. As a result, the amount of fluid coolant expended upon the tool elements 13 may be controlled and the discharge may be regulated so that the fluid coolant is only directed onto a tool element 13 while it is in a machining relationship with the work product.

Another significant aspect of this invention resides in the use of the handle 29. During a machining operation, the handle 29 is held by a suitable device such as a hook (not shown) to fixedly secure the metering assembly 24 with respect to the rotating shaft 10. It may be understood that prior to being locked in place, the handle 29 may be appropriately rotated about the axis of the shaft 10 so that the liquid coolant is discharged from the conduits 21 when the tool elements 13 are in a machining relationship with the work product. At the termination of the machining operation, the metering assembly 24 serves normally to shut off the flow of fluid coolant through one of the conduits 21. In certain instances, a conduit 21 may be aligned with the valve opening 34 to permit the continuing discharge of the fluid coolant from the conduit 21. The flow of fluid coolant may be cut off by rotating the handle 29 to thereby misalign the conduits 21 with respect to the valve opening 34.

In an illustrative embodiment of this invention, the conduits 21 take the form of a 1/16-inch diameter stainless steel tube having a nozzle or orifice of a 0.010-inch hole drilled at a closed end thereof. Under a pressure of approximately 80 psig, the fluid coolant such as the freon solvent may be evaporated upon contact with the tool element 13 as a gas to dissipate heat (approximately 0.24 BTU lb/deg. F) and in addition absorbing the heat vaporization (approximately 60 BTU 16.) This evaporation is substantially complete, leaving no residue. The rate of flow of the fluid coolant is also controlled by the size of this orifice of the conduit 21, and one orifice diameter of 0.01 inch proved effective in use with tool elements 13 of tungsten carbide at a cutting speed of 78 fpm. In comparison with the previous method of directing a continuous flow of fluid coolant onto the tool elements, the cutting speed was increased from approximately 30 fpm to 78 fpm on a boring mill. Other liquid coolants such as expanding gas or gases such as nitrogen in liquid form may be used which are not toxic or combustible. Further, in addition to saving a considerable quantity of the coolant, less time was required by avoiding the shut-down time needed to dress and reset the tools. In addition, the finish of the machine surface was also improved.

Numerous changes may be made in the above-described apparatus and different embodiments of the invention may be made without departing from the spirit thereof. Therefore, it is intended that all matter contained in the foregoing description and shown in the accompanying drawings, shall be interpreted as illustrative and not in a limiting sense.

I claim:

1. In machining apparatus including a plurality of tool elements rotatively mounted for successively operating upon a work product, the improvement comprising a variable coolant valve for supplying selectively a fluid coolant to one of the tool elements, said variable coolant valve comprising:
   a. means for defining an aperture disposed at a point fixed with respect to the rotation of the tool elements;
   b. means for receiving and directing the coolant fluid to said aperture;
   c. distributing means rotatable with the plurality of tool elements for providing conduits to each of the tool elements, said distributing means disposed so that upon rotation thereof each of the conduits is disposed successively in fluid transfer relation to said aperture;
   d. handle means attached to said means for defining an aperture so that the point fixed with respect to the rotation of the tool elements may be rotatably adjusted to vary coolant timing during operation or intentionally misalined to cut off coolant flow when not in operation; and
   e. means to vary the duration of the fluid transfer relationship between said aperture means and said distributing means.

2. A coolant valve as claimed in claim 1, wherein each of said conduits includes a first opening disposed to direct the fluid coolant onto an associated tool element, and a second opening disposed from the axis of rotation of the tool elements and angularly displaced from each other.

3. The coolant valve as claimed in claim 1, wherein said aperture is elongated to facilitate the continued fluid transfer relationship between said aperture and one of said conduits through a predetermined angle as said distributing means rotates, said angle selected to provide a predetermined amount of fluid coolant to each of said conduits.

4. The coolant valve as claimed in claim 1, wherein each of said conduits includes an opening disposed upon the circumference of a circle, said aperture being aligned with said circle and having a dimension therealong selected to provide metered amounts of the fluid coolant to each of said conduits.

5. The coolant valve as claimed in claim 1, wherein each of said conduits includes an opening for directing the coolant fluid onto its corresponding tool element, said opening being disposed from the tool element a distance sufficient to effect the evaporation of the fluid coolant upon contact with the corresponding tool element.

6. A machining apparatus including a plurality of tool elements rotatively mounted upon a shaft for successively operating upon a work product, the improvement comprising a coolant valve for variably and selectively supplying a fluid coolant to one of the tool elements, said variable coolant valve comprising:
   a. a plurality of conduits each having a first opening disposed upon the periphery of said shaft and a second opening disposed to direct the fluid coolant onto one of the plurality of tool elements;
   b. an annular-shaped metering assembly disposed about the shaft and having a passage for receiving and directing the fluid coolant to an aperture formed on the inner periphery of said metering assembly, said aperture disposed to be successively aligned with each of said first openings of said plurality of conduits to facilitate supply of the fluid coolant to that one of the tool elements in operative relation to the work product; and
   c. said metering assembly rotatably mounted including a handle means to facilitate adjustment of rotational alignment of said aperture and said conduit to vary coolant timing during operation and to facilitate misalignment when not in operation thus cutting off coolant flow.

7. The coolant valve as claimed in claim 6, wherein said aperture is elongated to facilitate the continued fluid transfer relationship between said aperture and one of said conduits through a predetermined angle of shaft roatation, said angle determined to provide a selected amount of fluid coolant to each of said conduits.

8. The coolant valve as claimed in claim 6, wherein said plurality of conduits are disposed within passages of the rotating shaft, and each of said second openings of said plurality of conduits comprising a nozzle for forming a jet of the fluid coolant and disposed from the corresponding tool element a distance sufficient to effect the evaporation of the fluid coolant upon contact with the corresponding tool element.

* * * * *